United States Patent [19]

Sato et al.

[11] Patent Number: 5,418,660
[45] Date of Patent: May 23, 1995

[54] INFORMATION PROCESSING APPARATUS FOR PROCESSING REPRODUCTION SIGNAL HAVING NONLINEAR CHARACTERISTICS

[75] Inventors: Naoki Sato, Kokubunji; Yasuhide Ouchi; Hideki Sawaguchi, both of Kodaira; Yosuke Hori, Hiratsuka; Yutaka Okada, Tokyo, all of Japan

[73] Assignee: Hitachi, Ltd.

[21] Appl. No.: 986,010

[22] Filed: Dec. 4, 1992

[30] Foreign Application Priority Data

Dec. 9, 1991 [JP] Japan ................................. 3-324393
Jan. 27, 1992 [JP] Japan ................................. 4-011728

[51] Int. Cl.$^6$ ........................ G11B 5/035; G11B 5/127
[52] U.S. Cl. ................................. 360/65; 360/113
[58] Field of Search ............... 360/46, 113, 51, 53, 360/32, 49, 36.1, 60, 65

[56] References Cited

U.S. PATENT DOCUMENTS

| 3,691,543 | 9/1972 | Mueller | 340/174 B |
| 3,959,820 | 5/1976 | Braun | 360/77 |
| 4,236,222 | 11/1980 | Loshbough et al. | 364/567 |
| 4,789,838 | 12/1988 | Cheng | 328/150 |
| 4,908,722 | 3/1990 | Sonobe | 360/46 X |
| 5,166,806 | 11/1992 | Ebisawa et al. | 358/342 |
| 5,220,466 | 6/1993 | Coker et al. | 360/46 |
| 5,272,481 | 12/1993 | Sauer | 341/165 |

FOREIGN PATENT DOCUMENTS 2-150114  6/1990  Japan ................................. 360/66

*Primary Examiner*—Donald Hajec
*Assistant Examiner*—Thien Minh Le
*Attorney, Agent, or Firm*—Antonelli, Terry, Stout & Kraus

[57] ABSTRACT

A nonlinear compensation A/D converting method and a circuit for compensating asymmetry of a reproduction signal waveform, so as not to deteriorate the performance of a discriminator even if there is a nonlinearity such that the amplitudes of the signal differ in dependence on the polarities of the waveforms like a reproduction waveform of an MR head are provided. Scales 1+ and 1− of an A/D converter are set to values which differ in dependence on the positive and negative polarities of the input signal, so that a nonlinear compensation which is suitable for a high accurate and high speed operation can be realized. Even an MR head in which the asymmetry between the upper and lower waveforms of the reproduction waveform is large can be used. A yield of the head can be improved.

15 Claims, 13 Drawing Sheets

F I G. 16
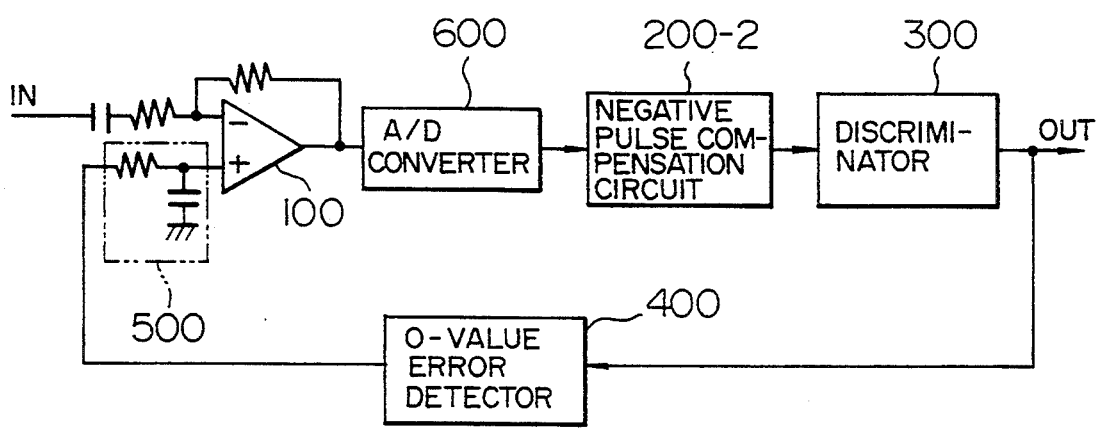
F I G. 17
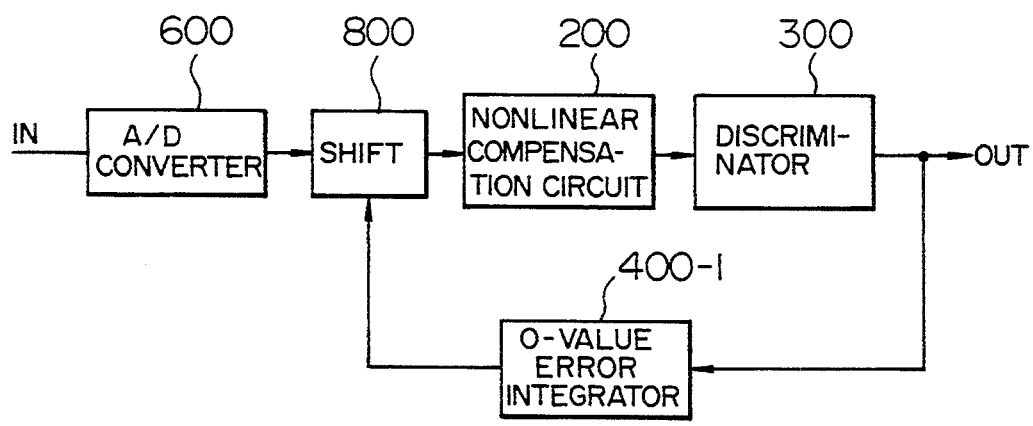

INFORMATION PROCESSING APPARATUS FOR PROCESSING REPRODUCTION SIGNAL HAVING NONLINEAR CHARACTERISTICS

BACKGROUND OF THE INVENTION

The present invention relates to a signal processing system for converting an analog signal into a digital signal and, more particularly, to such a signal processing system which is suitable to realize a high accurate digital discrimination in a system for reproducing information from a recording medium by using a magnetoresistive head (hereinafter, referred to as an MR head). More specifically, the present invention relates to an A/D converting technique to compensate asymmetry of the upper and lower amplitudes of a waveform which can occur in a reproduction waveform into symmetry.

There is an MR head as a reproducing head of a magnetic recording apparatus. The MR head has a feature such that sensitivity is better than that of an inductive type head. However, as for the reproduction waveform of the MR head, since the flux-to-voltage conversion of the device is nonlinear, as shown in FIG. 21, distortion such that upper and lower amplitudes differ occurs in the isolated magnetic transition. Such distortion corresponds to up to about 1.5 as a ratio of the upper and lower amplitudes. Such distortion cannot be compensated even by using a linear auto equalizer disclosed in, for example, JP-A-2-150114, so that an accuracy when discriminating as a digital signal is remarkably deteriorated.

A technique to compensate nonlinearity of a reproduction waveform by an MR head is disclosed in U.S. application Ser. No. 07/796,846, the disclosure of which is incorporated herein by reference.

SUMMARY OF THE INVENTION

According to the above method of U.S. application Ser. No. 07/796,846, bias magnetic field of the MR head is controlled. However, the method of controlling the magnetic bias field of the MR head has a problem such that the S/N ratio deteriorates even when the symmetry is improved.

It is an object of the present invention to provide a signal processing apparatus which can process an analog signal waveform having nonlinearity and can accurately convert the analog waveform into a symmetry digital signal.

Another object of the present invention is to provide a magnetic recording and reproducing apparatus which is suitable for a high speed operation of a high precision without deteriorating the performance of a discriminator even in the case where upper and lower amplitudes of an isolated magnetic transition differ as in a reproduction waveform of an MR head.

Still another object of the present invention is to provide a nonlinear compensation A/D converting method and circuit, in which by successively compensating the 0 level of a waveform or compensation amounts of upper and lower amplitudes, even in the case where an intensity of magnetic field that is applied to an MR head changes (for instance, magnetic field intensities at the inner and outer peripheries of a magnetic disk device), the operation can be adaptively executed.

One aspect of the invention is featured by comprising compensating means for compensating an asymmetry and executing a signal decoding without an error from an analog signal waveform having nonlinearity in which positive and negative polarities are asymmetric.

In accordance with an aspect of the invention, when a reproduced analog signal is converted into a digital signal, by setting a scaling of A/D conversion to different values of positive and negative polarities, the nonlinearity of the analog signal is compensated.

In accordance with another feature of the there may be provided means for detecting a conversion error at a discrimination value of 0 by using discrimination data; and means for compensating the 0 level by feeding back an output of such detecting means to an input of an A/D converter.

Further, the scalings at the positive and negative polarities of the A/D converter can be also successively compensated by using input data of the discriminator and the discrimination data or can be also sequentially compensated by using the peak values of both of the polarities of the input waveform of the A/D converter.

As for the output waveform when the isolated magnetic transition of a medium is reproduced by the MR head, since the MR device has nonlinear resistance change characteristics for the applied voltage, the values of the upper and lower amplitudes of the isolated pulse differ because of an excessive applied magnetic field or a variation in magnetic bias field. A compensating method in this instance will now be described with reference to FIG. 1. In FIG. 1, nonlinear characteristics are approximated by a folded line.

It is now assumed that upper and lower amplitude values of a waveform X after equalization are set to $V+$ and $V-$ the input levels corresponding to outputs 1 and $-1$ of the discriminator are set to $V_0$ and $-V_0$, respectively. In this case, as for the scaling of the A/D converter, by performing the scaling of $L+ (=V_0/V+)$ on the positive side and the scaling of $L-(=V_0/V-)$ on the negative side, upper and lower waveforms of an output Y of the A/D converter can be compensated so as to be symmetric.

On the other hand, the shift of the 0 level due to the fact that the upper and lower waveforms are asymmetric is successively compensated by a feedback circuit from the result of the discrimination, so that the scaling can be more accurately performed. Further, by successively compensating the scaling of the A/D converter from the waveform after equalization or from the data after A/D conversion, the asymmetric waveforms can be compensated so as to be symmetric in a real-time manner.

According to another aspect of the invention, a signal processing apparatus for reproducing data from an input signal comprises: a circuit to generate the input signal; a compensation circuit to compensate nonlinearity of the apparatus; and a detector which receives an output of the compensation circuit and discriminates the data and reproduces it. Particularly, to accurately make the compensation circuit operative, bias means for feeding back an error signal which is obtained from the detector and setting a bias of the compensation circuit is provided on the input side of the compensation circuit.

The compensation circuit and the bias means can be also constructed by any one of an analog circuit and a digital circuit. They can be also combined with an equalizing filter for waveform shaping or the like instead of the nonlinear compensation. In the case where the equalizing filter is provided on the input side of the nonlinear compensation circuit, means for performing the feed back nonlinear compensation is provided to update a filter coefficient.

The nonlinear compensation circuit of the invention has a function to compensate an asymmetric signal generated from the MR head or the like into a symmetric signal. Therefore, an amplitude detection, a peak detection, or a maximum likelihood detection can be used as a data detection method which could not be applied as a conventional signal processing circuit of the MR head. Those techniques are disclosed in, for example, "Adaptive Equalization in Magnetic-disk Storage Channels", IEEE Communications Magazine, pages 14 to 29, February, 1990.

Further, in the bias means, a residual error for a predetermined level of the signal is detected by a 0-value error detector and the signal which is obtained from the error is fed back to the bias setting circuit, so that a bias to supply the asymmetric signal to the nonlinear compensation circuit can be set to the optimum value.

Moreover, to stabilize the above feedback system, a level detector to eliminate an influence due to large noise or the like can be also provided.

BRIEF DESCRIPTION OF THE DRAWINGS

FIG. 16 is a block diagram showing a further embodiment of a signal processing apparatus of the invention;

FIG. 17 is a block diagram showing a still further embodiment of a signal processing apparatus of the invention;

DETAILED DESCRIPTION OF THE PREFERRED EMBODIMENTS (Embodiment 1)

Figure 1:
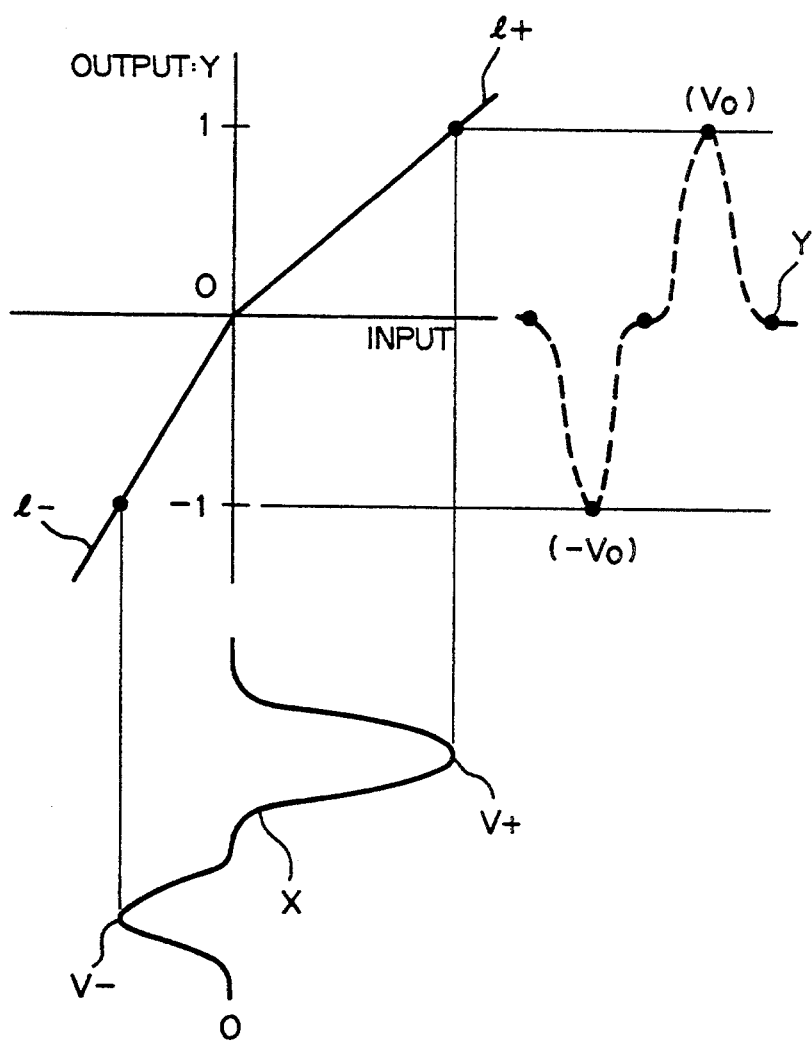
FIG. 1 is a waveform diagram showing a principle of the present invention.
Figure 2:
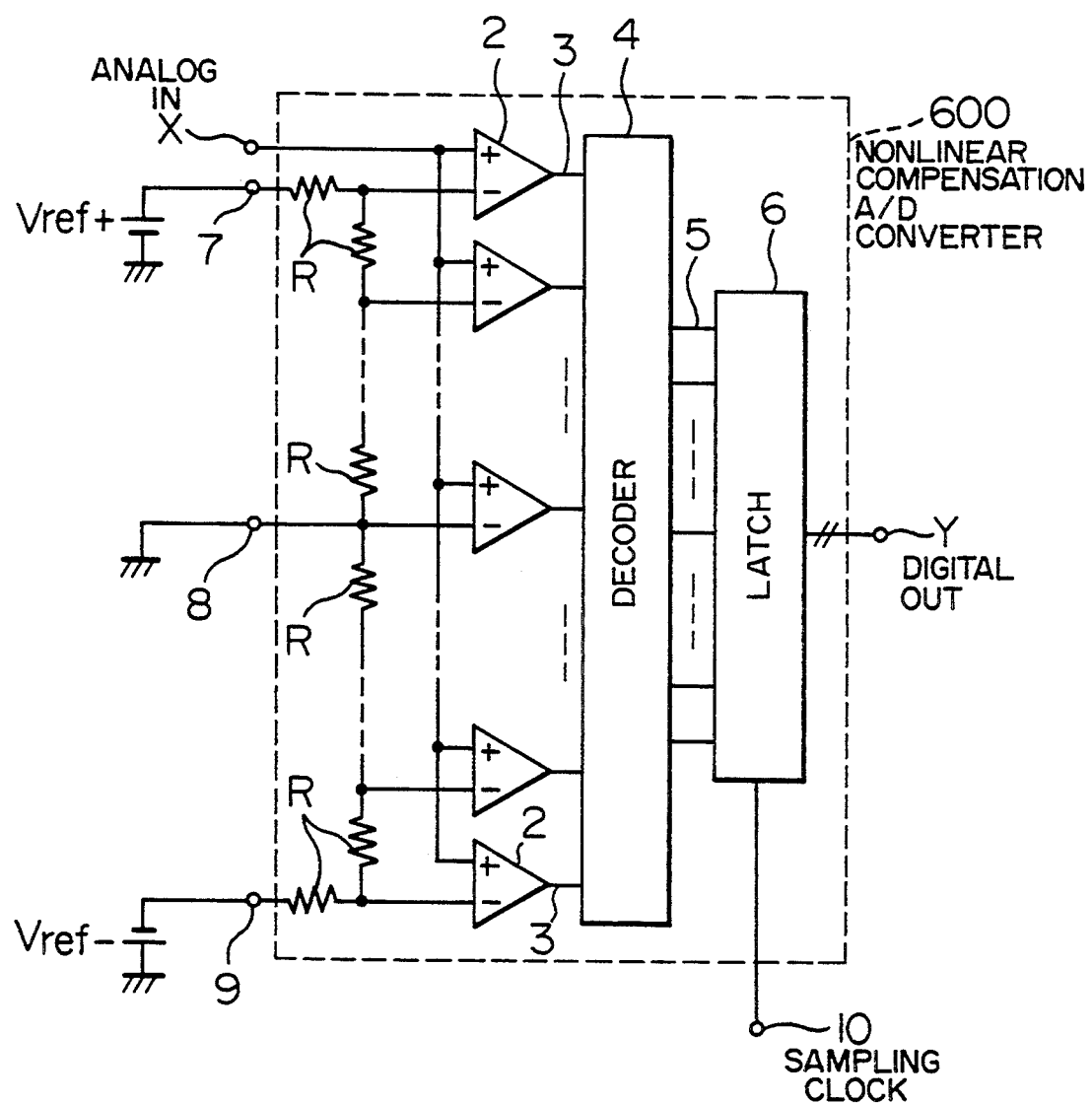
FIG. 2 is a block diagram showing an embodiment of a signal processing apparatus of the invention.

FIG. 2 shows an embodiment of an A/D converting section of a signal processing apparatus according to the present invention.

A nonlinear compensation A/D converter 600 is an A/D converter of a flash type using series-connected ladder resistors R. An intermediate terminal 8 (REFM) of the ladder resistors R is connected to the ground. Potentials ($V_{ref}+$ and $V_{ref}-$) which are obtained by respectively multiplying the peak values of an isolated pulse after equalization by a constant K (1 to 2) are supplied to terminals 7 and 9 (REF+ and REF−) at both ends of the ladder resistors R, respectively.

Each of comparators 2 compares the potential of a reproduction waveform after equalization which is supplied to a terminal X with a DC potential between the respective ladder resistors R and supplies a comparison result 3 to a decoder 4. The decoder 4 converts an output of each comparator 2 at each level into a binary value. The binary value is latched into a latch circuit 6 at an input timing of a sampling clock 10. The output of the latch circuit 6 is provided at a terminal Y.

As mentioned above, the A/D conversions whose scalings differ in the positive and negative polarities can be performed, so that the upper and lower asymmetric reproduction waveforms are compensated to symmetric waveforms and converted into digital signals. Although the intermediate terminal 8 of the ladder resistors has been connected to the ground in the embodiment, it will be obviously understood that the terminal 8 can be arbitrarily set in a range of an input voltage of the A/D converter 600. Further, the designation of the scaling is not limited to the two points of $V_{ref}+$ and $V_{ref}-$. It will be also obviously understood that by setting potentials at arbitrary connecting points of the ladder resistor, the compensation can be more accurately performed. In such a case, the resistance value of the ladder resistor can be also changed.

Figure 3:
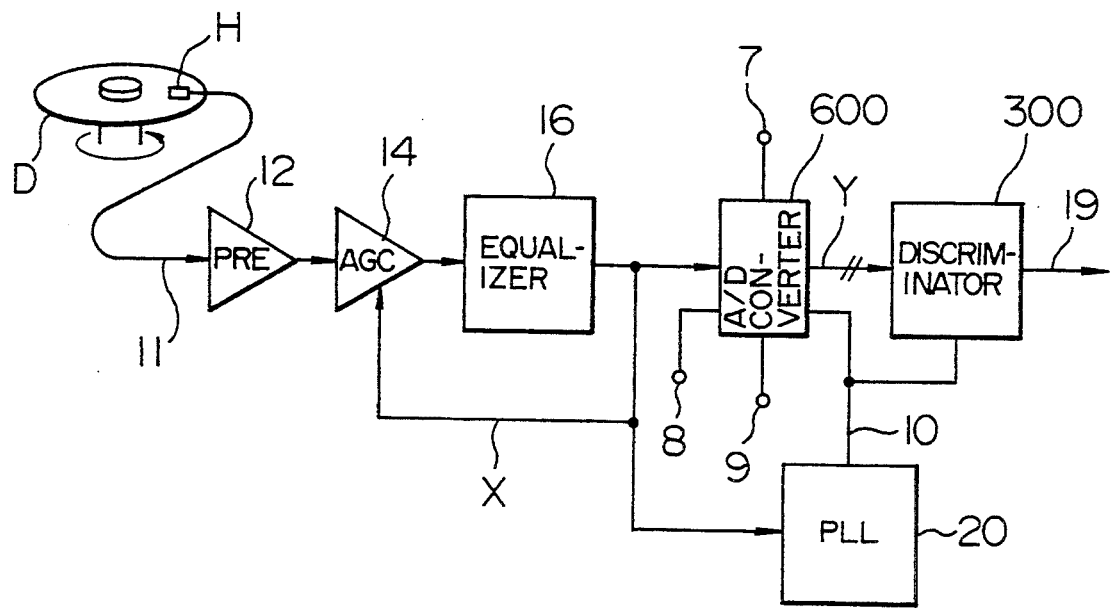
FIG. 3 is a block diagram showing an embodiment of an information reproducing apparatus of the invention.

FIG. 3 shows an embodiment in which the embodiment of FIG. 2 is applied to a magnetic recording and reproducing apparatus such as a magnetic disk device or the like.

Magnetic information recorded on a magnetic disk D as a recording medium is converted into an electrical signal (head output signal 11) by an MR head H. The signal 11 is amplified by a pre-amplifier 12 and supplied to an automatic gain control (AGC) circuit 14. The AGC circuit 14 automatically adjusts a gain of the signal so that the signal may have a predetermined amplitude at the output of an equalizer 16. In this instance, the equalizer 16 adjusts the signal 11 to have a characteristic equalized relative to either one of the positive and negative polarities of the isolated transition. The isolated transition X whose upper and lower waveforms are asymmetric and which is an output of the equalizer 16 is supplied to the nonlinear compensation A/D converter 600 shown in the embodiment of FIG. 2 and is also used to produce the clock 10 which is necessary for A/D conversion and discrimination by a phase locked loop (hereinafter, abbreviated to a PLL) 20. The digital signal Y which has been compensated to symmetric waveforms by the nonlinear compensation A/D converter 600 is discriminated by a discriminator 300 such as a Viterbi detector. The discriminator 300 can use a well-known circuit construction disclosed in JP-A-60-47538 or the like.

(Embodiment 2)

Figure 4:
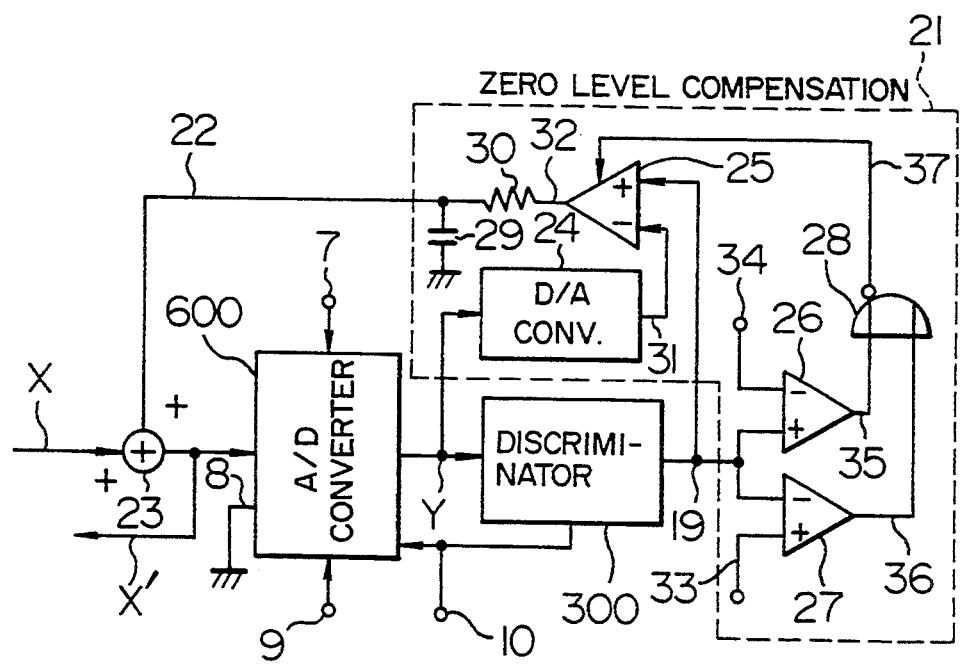
FIG. 4 is a block diagram showing an embodiment of a signal processing apparatus of the invention.

FIG. 4 diagrammatically shows another embodiment of the present invention, which includes a zero (0) level compensation circuit 21.

The output Y of the nonlinear compensation A/D converter 600 is supplied to the discriminator 300 and an analog waveform 31 after completion of the compensation is produced by a D/A converter 24. The analog waveform 31 is compared with an output 19 of the discriminator 300 only when the output of the discriminator 300 is equal to 0. When the waveform 31 after the compensation is negative, a DC component 21 is added to the reproduction waveform X after the equalization. Consequently, the 0 level is reconstructed by the output Y of the A/D converter 600. Specifically, a comparator 25 is controlled by an enable signal 37 of the compensating operation which is constructed by comparators 26 and 27 and an OR circuit 28 so as to perform the compensation only when the output 19 of the discriminator 300 is equal to 0. An output 32 of the comparator 25 is transmitted through a low pass filter including a resistor 30 and a capacitor 29, so that the signal 22 is derived. The signal 22 is supplied to an adder 23. The input on the positive polarity side of the comparator 25 can be also previously coupled to a DC potential of the 0 level. In place of compensating the 0 level by the adder 23, it is also possible to invert the polarity of the signal and to supply the inverted signal to the intermediate terminal 8 of the ladder resistors of the A/D converter 600. Further, it will be obviously understood that in place of the D/A converter 24, only the positive and negative signs of the output Y can be also detected.

According to the embodiment, by successively repeating the compensating operation of the 0 level, the 0 level of the signal waveform which has been lost in the reproduction by the MR head is reconstructed and the more accurate compensation for the signal of which upper and lower waveforms are asymmetric can be realized. In the embodiment, even when the characteristics of the MR head and the medium change with time, it is possible to adaptively cope with such changes.

Figure 5:
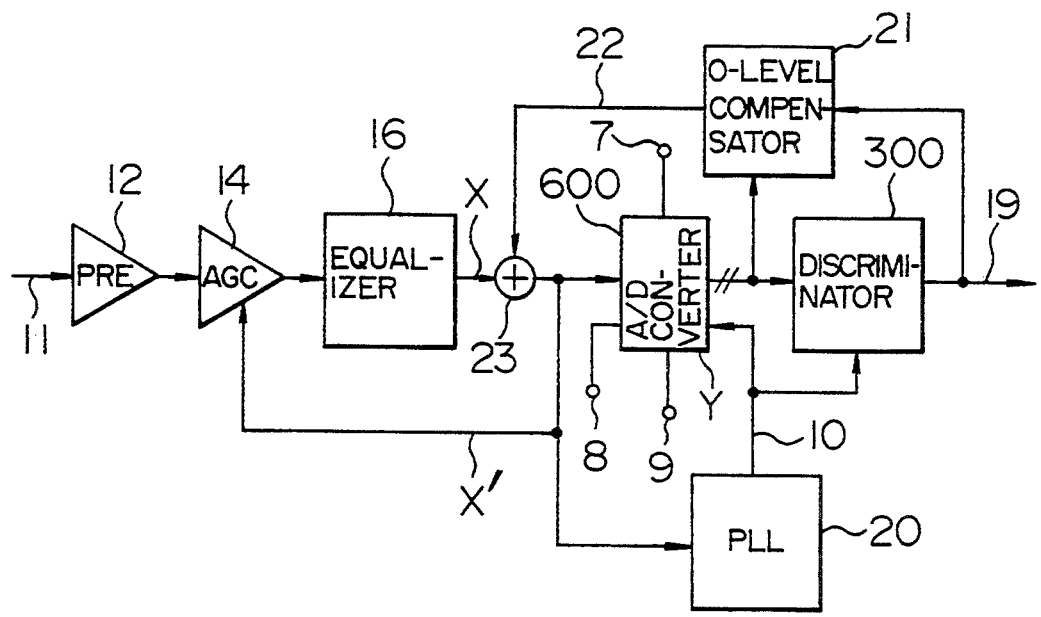
FIG. 5 is a block diagram showing an embodiment of an information reproducing apparatus of the invention.

FIG. 5 shows an embodiment in which the circuit of FIG. 4 is applied to a signal processing circuit for reproduction waveform. In FIG. 5, the same component elements as those shown in FIGS. 2 and 3 are designated by the same reference numerals.

(Embodiment 3)

Figure 6:
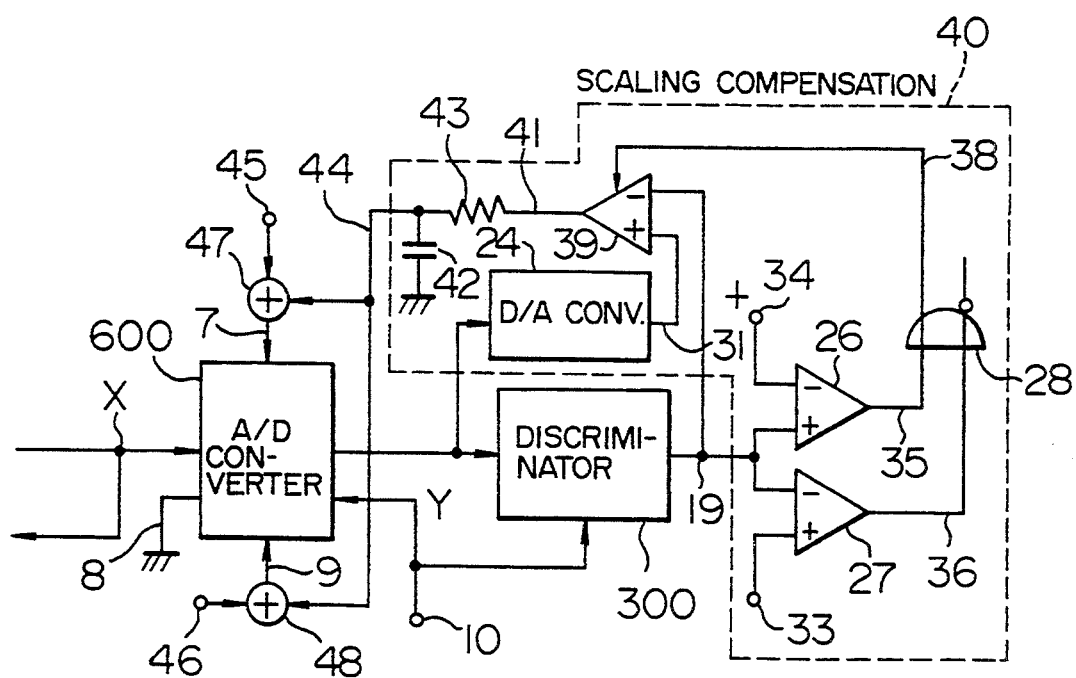
FIG. 6 is a block diagram showing an embodiment of a signal processing apparatus of the invention.

FIG. 6 diagrammatically shows another embodiment of the present invention which includes a scale compensation circuit 40.

An output Y of the nonlinear compensation A/D converter 600 is supplied to the discriminator 300 and the analog waveform 31 after completion of the compensation is formed by the D/A converter 24. The analog waveform 31 is compared with the output 19 of the discriminator 300 when the output of the discriminator 300 is equal to $-1$ or 1. When the waveform 31 after completion of the compensation is larger than the output 19 ($-1$, 1) of the discriminator 300, the potentials at the terminals 7 and 9 by which the scalings of the compensation are determined are compensated in an ascending direction. Thus, the output Y of the A/D converter 600 is compensated in such a direction as to decrease the amplitude on the positive polarity side and to increase the amplitude on the negative polarity side. More specifically, a comparator 39 is controlled by an enable signal 38 which is produced by the comparators 26 and 27 and the OR circuit 28 so as to perform the compensation when the output 19 of the discriminator 300 is equal to $-1$ or 1. An output signal 41 is transmitted through a low pass filter including a resistor 43 and a capacitor 42 and is similarly added to two adders 47 and 48, thereby compensating the initial potentials at terminals 45 and 46. As for the input on the negative polarity side of the comparator 39, DC potentials at decision levels of $-1$ and 1 of the discriminator 300 can be preset and alternately switched. It is also easily possible to construct in a manner that two sets each including the comparator 39, resistor 43, and capacitor 42 are provided and the scalings of the positive and negative polarities can be independently controlled. Further, it will be obviously understood that in a manner similar to the embodiment of FIG. 4, only the positive and negative signs of the output Y can be also detected in place of the D/A converter 24.

According to the embodiment, by successively repeating the compensating operation of the scaling, the asymmetry of the upper and lower waveforms of a signal which occurs due to the reproduction by the MR head can be more accurately compensated. On the other hand, according to the embodiment, even when the characteristics of the MR head and the medium change with the elapse of time, it is possible to adaptively cope with such changes. Further, by independently controlling with respect to the positive and negative polarities, it is also possible to compensate a variation of the amplitude of the waveform after completion of the equalization.

Figure 7:
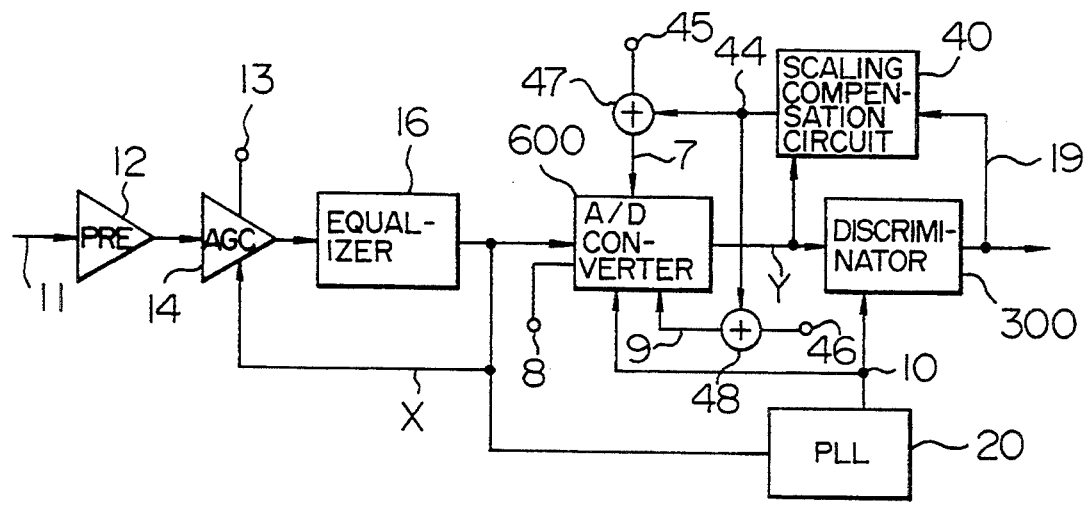
FIG. 7 is a block diagram showing an embodiment of an information reproducing apparatus of the invention.

FIG. 7 shows an embodiment in which the circuit of FIG. 6 is applied to a signal processing circuit of a reproduction waveform. In FIG. 7, the same component elements as those shown in FIGS. 2 and 3 are designated by the same reference numerals.

(Embodiment 4)

Figure 8:
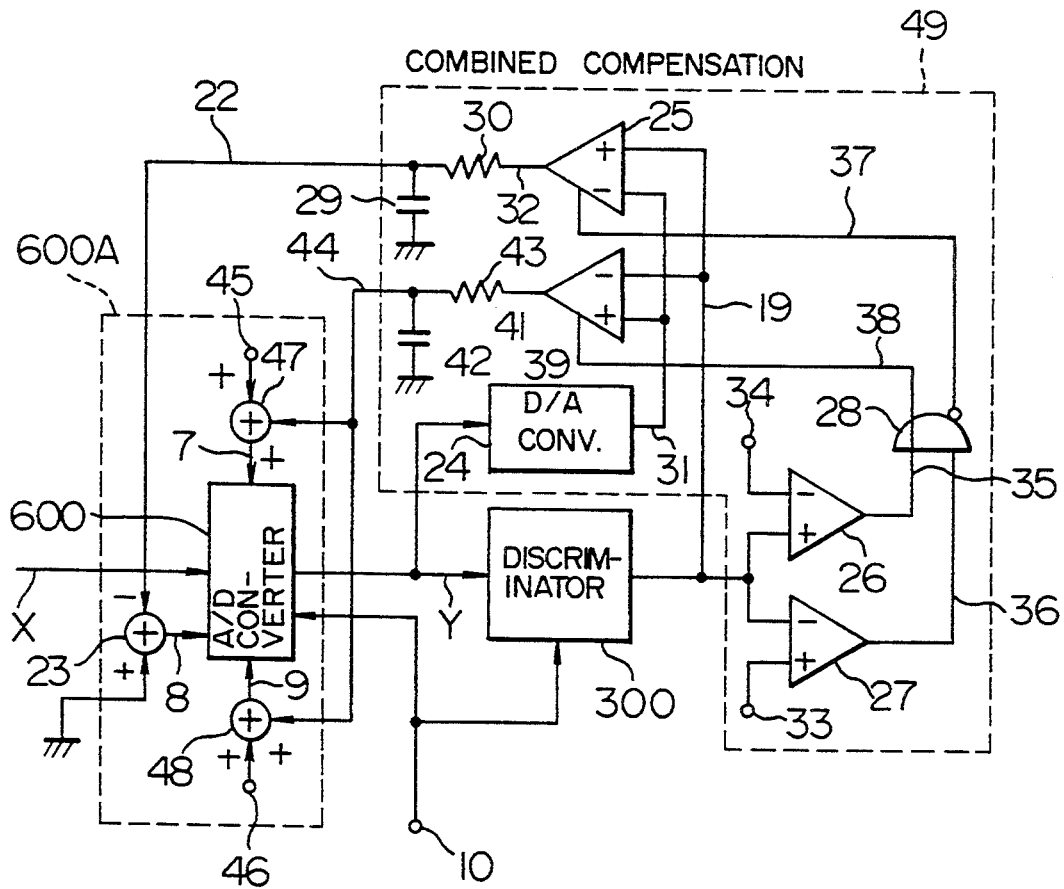
FIG. 8 is a block diagram showing an embodiment of a signal processing apparatus of the invention.

FIG. 8 diagrammatically shows another embodiment of the present invention. The embodiment of FIG. 8 uses a compound compensation circuit 49 in which the techniques shown in the embodiments of FIGS. 4 and 6 are compounded.

The output Y of the nonlinear compensation A/D converter 600 is supplied to the discriminator 300 and the analog waveform 31 after completion of the compensation is produced by the D/A converter 24. The analog waveform 31 is compared with the output 19 of the discriminator 300, the 0 level is reconstructed, and the scalings are compensated. In this case, an output terminal of a subtracter 23' is connected to the intermediate terminal 8 of the A/D converter 600, a subtraction terminal is connected to the signal to compensate the 0 level, and an addition terminal is connected to the ground, respectively. In this case as well, it is also easily possible to provide two sets each including the comparator 39, resistor 43, and capacitor 42 and to independently control with respect to the positive and negative polarities. Further, it will be obviously understood that in a manner similar to the third embodiment, only the positive and negative signs of the output Y can be also detected in place of the D/A converter 24.

According to the embodiment, by successively repeating the reconstruction of the 0 level and the compensating operation of the scaling, the asymmetry of the upper and lower waveforms which occurs due to the reproduction by the MR head can be more accurately compensated. In the embodiment, even when the characteristics of the MR head and the medium change with the elapse of time, it is possible to adaptively cope with such changes. Further, by independently controlling the compensation of the scalings with respect to the positive and negative polarities, it is also possible to cope with a fluctuation of the amplitude.

By forming a circuit 600A including the A/D converter 600 and adders/subtracter (23', 47, 48) in an IC form, the circuit construction can be simplified.

Figure 9:
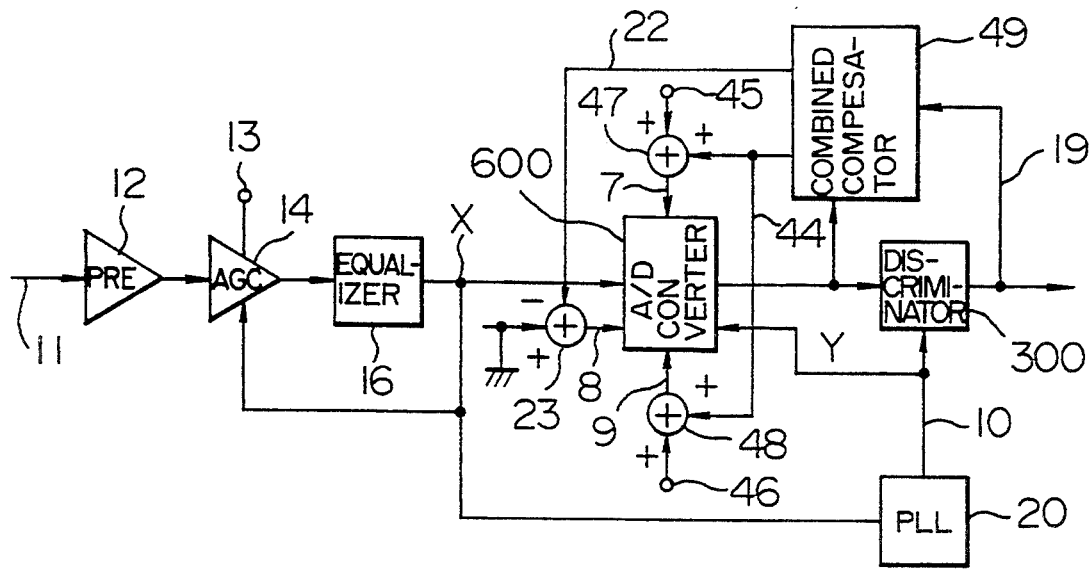
FIG. 9 is a block diagram showing an embodiment of an information reproducing apparatus of the invention.

FIG. 9 shows an embodiment in which the circuit arrangement of FIG. 8 is applied to a signal processing circuit of a reproduction waveform. In FIG. 9, the same component elements as those shown in FIGS. 2 and 3 are designated by the same reference numerals.

(Embodiment 5)

Figure 10:
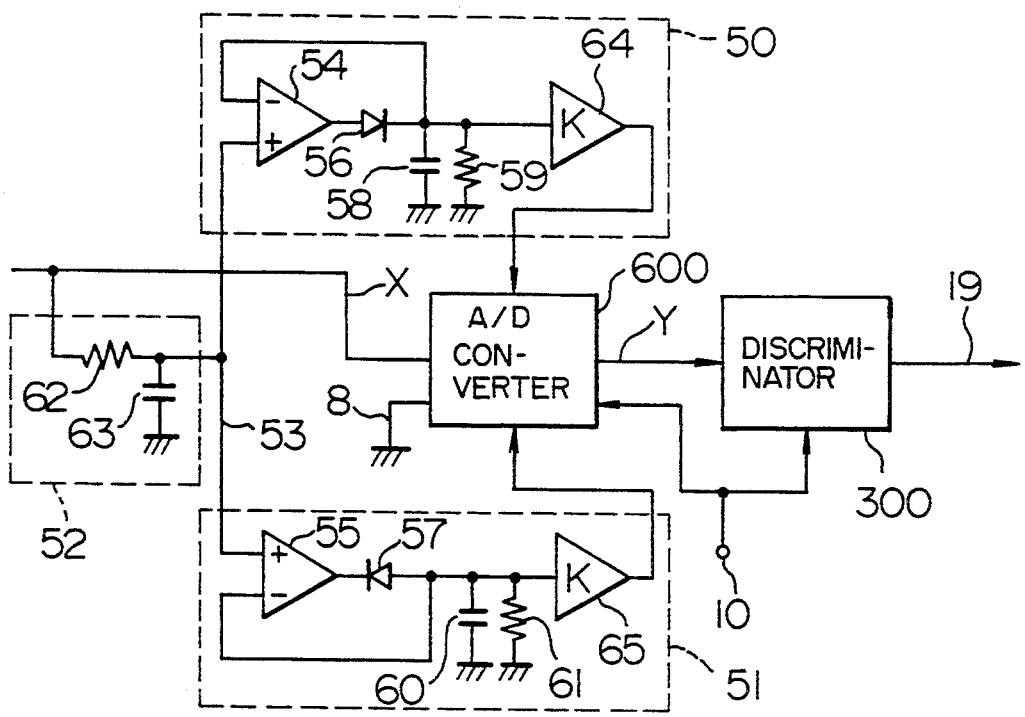
FIG. 10 is a block diagram showing an embodiment of a signal processing apparatus of the invention.

FIG. 10 shows another embodiment of the present invention. The circuit arrangement of FIG. 10 includes a positive polarity peak holding circuit 50 and a negative polarity peak holding circuit 51 for setting the scalings of the positive and negative polarities of the nonlinear compensation A/D converter 600 from the waveform X after completion of the equalization.

The waveform X after the equalization is supplied to the A/D converter 600 and is transmitted through a low pass filter 52 having a resistor 62 and a capacitor 63 and is sent to the positive polarity peak holding circuit 50 and the negative polarity peak holding circuit 51. In the peak holding circuit of each polarity, an output of a rectifier including an operational amplifier 54 (or 55) and a diode 56 (or 57) is held by a capacitor 58 (or 60) and is leaked through a resistor 59 (or 61) by a proper time constant. Further, the leaked signal is multiplied by K times by a constant gain amplifier 64 (or 65) and is supplied to the terminal 7 (or 8) which determines the scaling of each polarity. A constant K of the constant gain amplifier 64 (or 65) is set to a value within a range of about 1 to 2.

According to the embodiment, since the compensation adaptive to a change in input waveform can be embodied without being accompanied with a feed-back operation, a compensation effect of an extremely stable nonlinear waveform can be expected.

Figure 11:
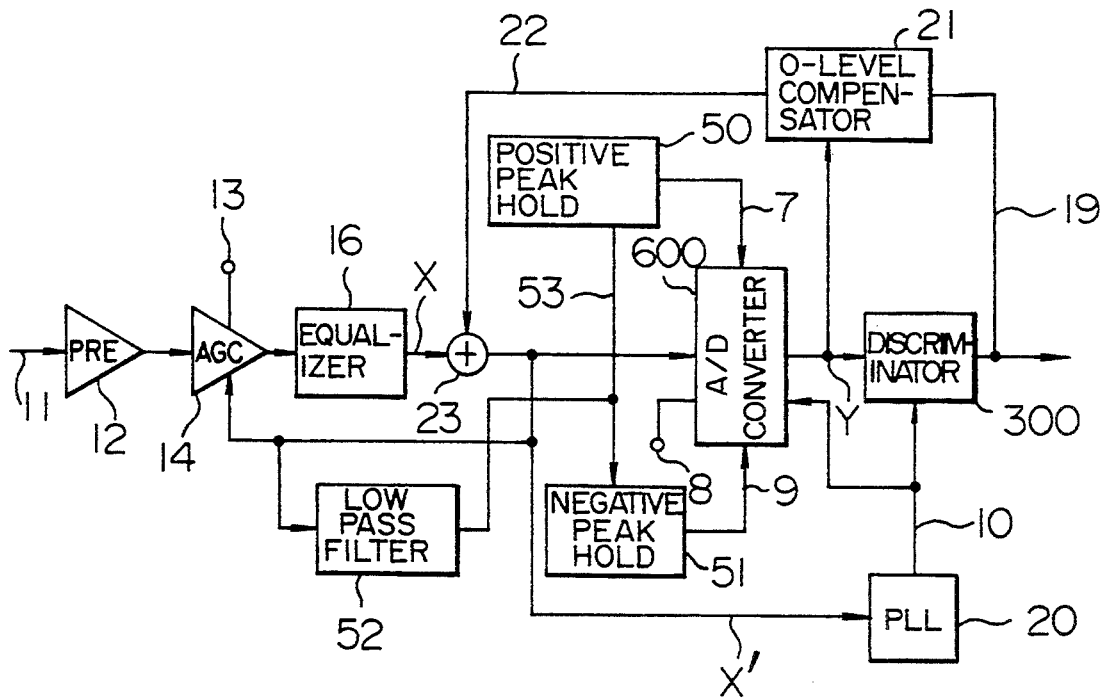
FIG. 11 is a block diagram showing an embodiment of an information reproducing apparatus of the invention.

FIG. 11 shows an embodiment in which the circuit of FIG. 10 is applied to a signal processing circuit of a reproduction waveform.

(Embodiment 6)

Figure 12:
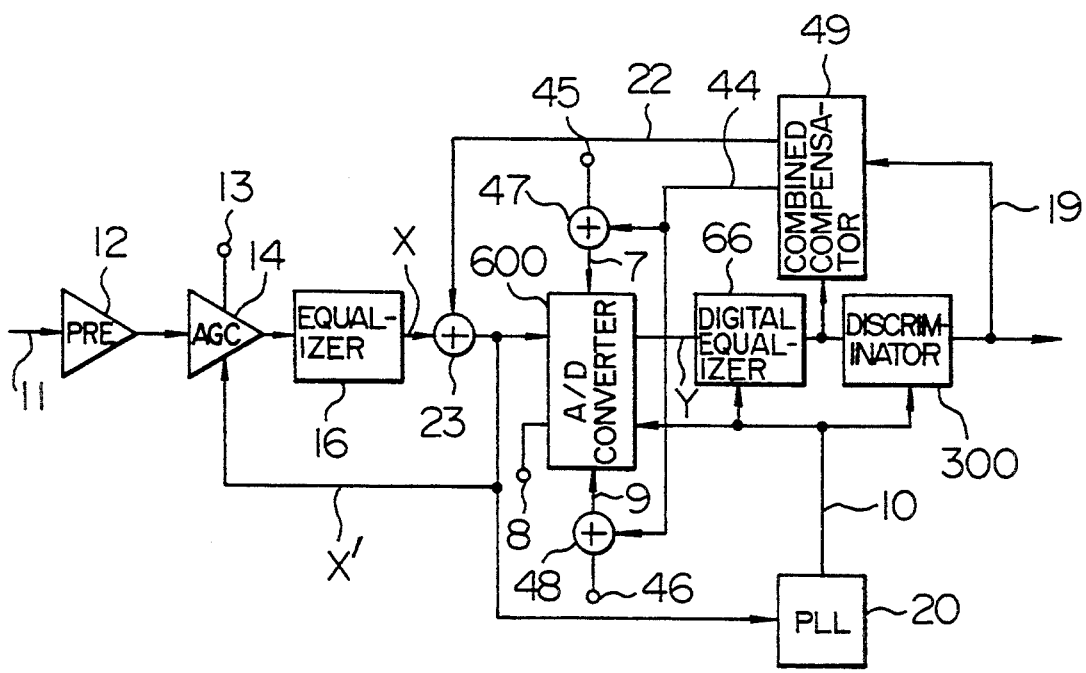
FIG. 12 is a block diagram showing another embodiment of an information reproducing apparatus of the invention.

FIG. 12 shows another embodiment of the present invention.

The embodiment of FIG. 12 fundamentally has the construction shown in FIG. 9. In such a construction, the analog waveform equalizer 16 is used for coarse equalization and a digital waveform equalizer 66 for fine equalization is inserted at the succeeding stage of the nonlinear compensation A/D converter 600.

In the embodiment of FIG. 12, by adaptively making the digital waveform equalizer 66 operative, even if the asymmetry of the upper and lower waveforms of the MR reproduction waveform and the intersymbol interference fluctuate, such fluctuations can be compensated. On the other hand, in dependence on a particular waveform of the head output 11, proper compensation can be achieved even if the analog equalizer 16 is eliminated.

In the invention, although the AGC circuit 14 and the PLL 20 have been controlled using the analog signal X', the AGC circuit 14 and VCO in the PLL 20 can be also controlled by using a digital control circuit of the AGC and a voltage controlled oscillator (hereinafter, abbreviated to a VCO) to which an output Z of the digital waveform equalizer 66 and the discrimination data 19 are supplied. It is also possible to modify the circuit in a manner that timings to make the comparators 25 and 39 of a tristate shown in FIGS. 4, 6, and 8 active are controlled by the absolute value of the output Y of the nonlinear A/D converter 600 and enable signals 37 and 38 and are increased or decreased in accordance with an error amount, thereby reducing the compensating time.

(Embodiment 7)

Figure 13:
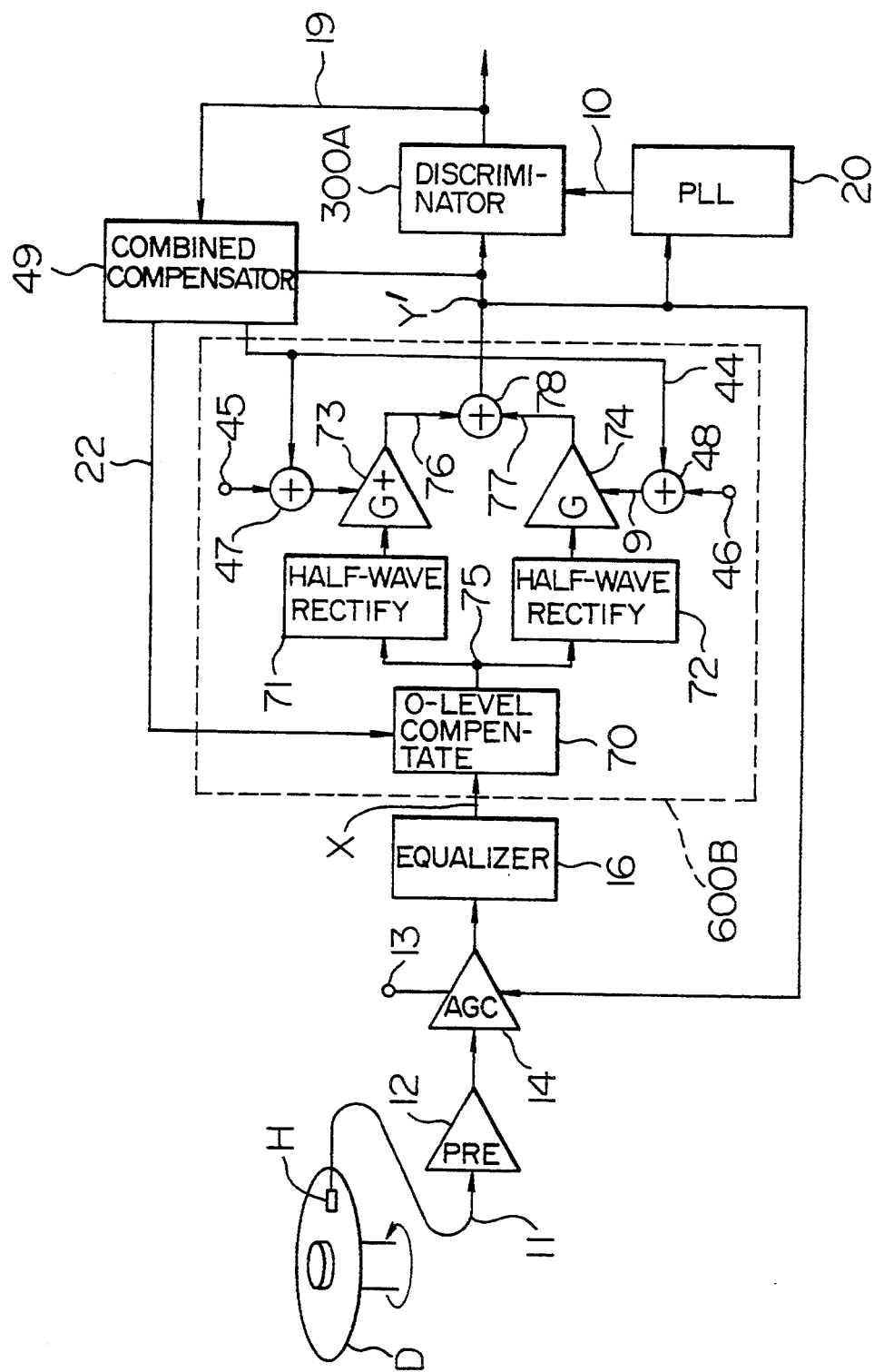
FIG. 13 is a block diagram showing a further embodiment of an information reproducing apparatus of the invention.

FIG. 13 diagrammatically shows another embodiment of the present invention.

Although the fundamental construction is similar to that of the embodiment shown in FIG. 3, an analog nonlinear compensation circuit 600B is used in place of the A/D converter.

Magnetic information on a recording medium such as a magnetic disk D or the like is converted into an electrical signal 11 by an MR head H. The waveform of the electrical signal 11 is shaped through the preamplifier 12, AGC 14, and waveform equalizer 16. The symmetry of the waveform with respect to the positive and negative polarities is compensated by the analog nonlinear compensation circuit 600B and is further identified by a discriminator 300A to which an analog input is applied.

The construction and operation of the analog nonlinear compensation circuit 600B will now be described hereinbelow. The 0 level of the output X of the waveform equalizer 16 as an input signal is compensated by a 0 level level compensation circuit 70 using the 0 level compensation signal 22. An output 75 of the 0 level compensation circuit 70 is separated into output signals of the positive and negative polarities by half-wave rectifying circuits 71 and 72. After that, the separated signals are controlled by a signal 44 by variable gain amplifying circuits 73 and 74 so as to have an equal amplitude. Further, both of the waveforms are reconstructed or recomposed by an adder 78.

In the embodiment of FIG. 13, the construction is more simplified than the circuit construction using the A/D converter.

In the embodiment of the present invention, although nothing has been referred to with respect to the characteristics of the reproducing circuit and the discriminating method, it will be obviously understood that the partial response channel characteristics can be given to the waveform equalizer or the maximum likelihood detection can be applied to the discriminator. It will be also obviously understood that the discriminator shown in the embodiment is simply constructed and is used only for the compensation of the 0 level, compensation of the symmetry of the upper and lower waveforms, or control of the PLL or AGC and that the signals Y, Y', and Z can be also applied to another discriminator of a high performance.

In the above embodiment, the applying point of the compensation signal 22 at the 0 level can be also set to the input terminal of the waveform equalizer 16.

(Embodiment 8)

Figure 14:
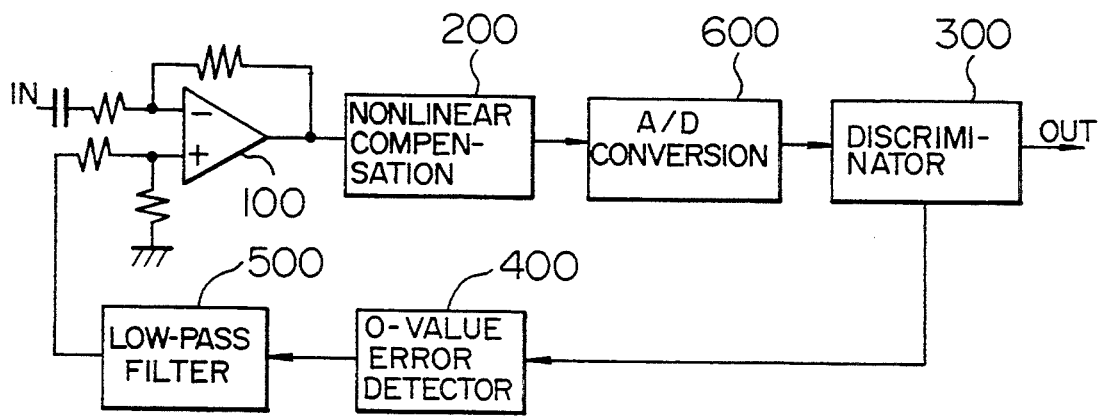
FIG. 14 is a block diagram showing an embodiment of a signal processing apparatus of the invention.

FIG. 14 is a constructional diagram of an embodiment of another signal processing apparatus according to the present invention. The signal processing apparatus includes a bias setting circuit 100 which receives an output of an MR head or the like as an input signal and is constructed of an analog circuit such as an operational amplifier or the like; a nonlinear compensation circuit 200; a discriminator 300; a 0-value error detector 400; a low pass filter 500; and an A/D converter 600. The input signal passes through the bias setting circuit 100 and is sent to the nonlinear compensation circuit 200.

Figure 21:
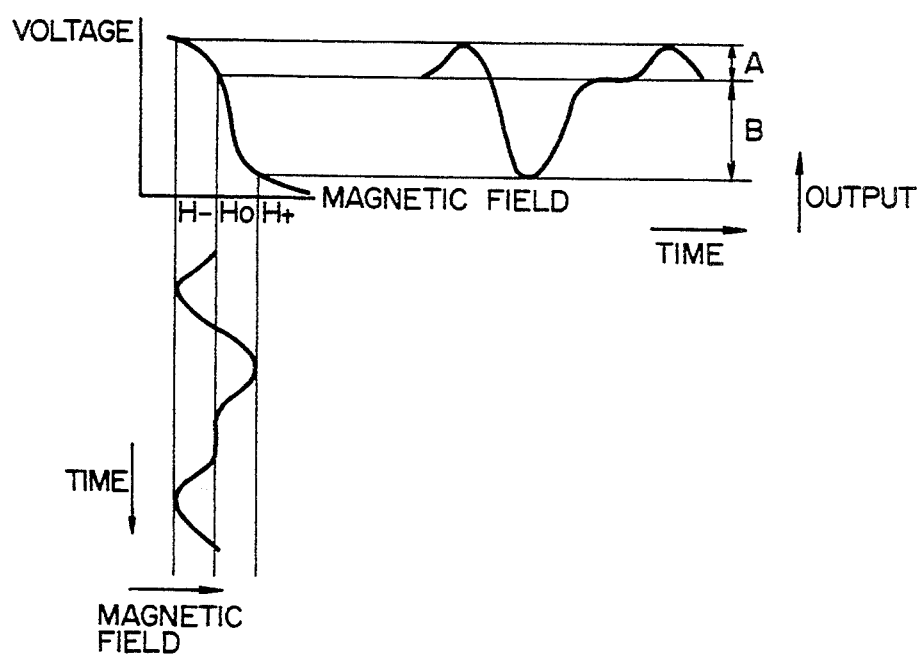
FIG. 21 is a waveform diagram showing nonlinearity of a reproduction waveform of an MR head.
Figure 22:
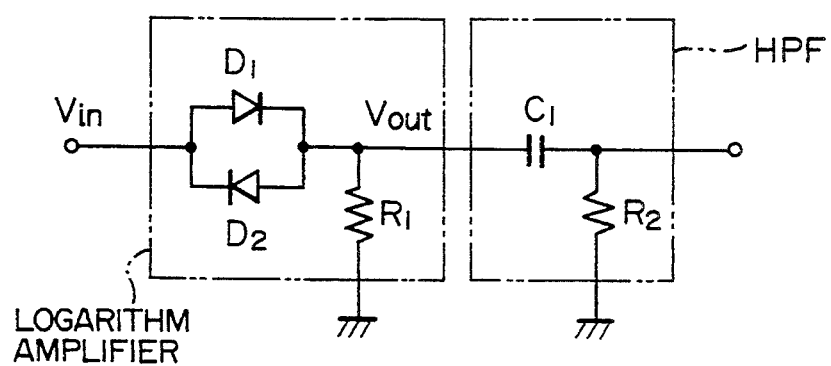
FIG. 22 is a circuit diagram showing an example of a nonlinear compensation circuit of the invention.
Figure 23:
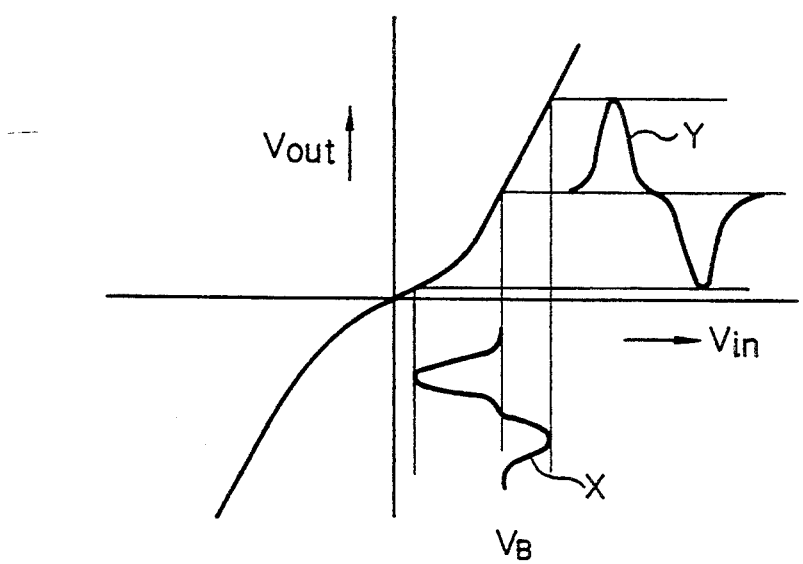
FIG. 23 is a waveform diagram showing the operation of the nonlinear compensation circuit.

FIG. 22 shows an example of the nonlinear compensation circuit 200. The nonlinear compensation circuit 200 is an analog circuit which is constructed of a logarithm amplifier $A_1$ including diodes $D_1$ and $D_2$ of which polarities are inversely connected and a resistor $R_1$; and a high pass filter HPF including a capacitor $C_1$ and a resistor $R_2$. As shown in FIG. 23, the logarithm amplifier A1 compensates nonlinear characteristics of analog signal as shown in FIG. 21 by a bias voltage VB and generates a signal such as a waveform Y in which positive and negative waveforms are symmetric. Such a signal is supplied to the discriminator 300 through the high pass filter HPF and the A/D converter 600, thereby discriminating a data. In the embodiment, conventional techniques can be used as an A/D converter 600 and a discriminator 300. To reduce a bit rate, it is effective to perform a process of a maximum likelihood detection disclosed in "The Viterbi Algorithm". Proceeding of the IEEE, Vol. 61, No. 3, pages 268–277, March, 1973, or the like.

The 0-value error detector 400 detects an error for the signal of the discriminator 300 in which the result of data discrimination has been determined to be "0", that is, a difference between the input value to the decoder 300 of the signal which has been decided to be "0" and a mark for "0". An output of the 0-value error detector 400 is obtained, for instance, in the following manner. That is, when the error is larger than a first predetermined value, the output signal of the detector 400 is set to 0 V. When the error is smaller than a second predetermined value, the output signal is set to 5 V. When the error is set to an intermediate value between the first and second predetermined values, the output signal is set at a high impedance value. The output signal is fed back to the bias setting circuit 100 through the low pass filter 500, thereby setting a bias reference value. By the above method, the error for the signal which is determined to be "0" can be gradually reduced as an average. Consequently, a proper bias for the nonlinear compensation circuit 200 can be set.

(Embodiment 9)

Figure 15:
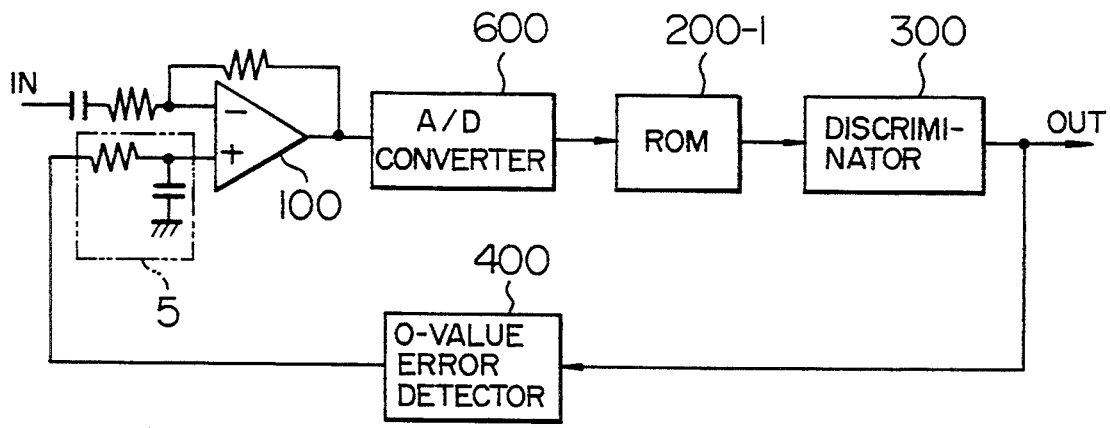
FIG. 15 is a block diagram showing another embodiment of a signal processing apparatus of the invention.

FIG. 15 constructionally and diagrammatically shows another embodiment of a signal processing apparatus according to the present invention. According to the embodiment, the nonlinear compensation circuit 200 in the embodiment of FIG. 14 is realized by an ROM (read only memory) 200-1. The remaining of the circuit is similar to that of the embodiment of FIG. 14.

To process the nonlinear compensation by a digital circuit (ROM) 200-1, the A/D converter (analog/digital converter) 600 is provided on the input side of the ROM 200-1 and the output of the A/D converter 600 is set at an address in the ROM 200-1. The low pass filter 500 in the first embodiment is constructed of a circuit including a resistor and a capacitor. In the embodiment, since the nonlinear compensation circuit 200 is constructed of a digital circuit, the circuit can be realized without an unevenness in the manufacturing. There is also an advantage such that the circuit can cope with the characteristics of any head by merely changing the ROM. On the other hand, it will be also obviously understood that an RAM (random access memory) can be used in place of the ROM. In case of the RAM, even if there is an unevenness in characteristics of the head or there is an aging change, the characteristics can be written for every head, so that the optimum nonlinear compensation can be performed to every head. Further, by executing a control so as to properly rewrite the content in the RAM, the compensation of nonlinear distortion according to the condition of the signal or apparatus can be realized.

In the embodiment, the 0-value error detector 400 is also constructed of a digital circuit. Now, assuming that the A/D converter is of six bits and, further, the input signal of the 0-value error detector 400 is constructed of six bits, for example, it is sufficient to make the above circuit operative in the following manner. That is, when the error for the signal in which the result of the decoding is determined to be "0" is equal to or larger than 100001, the output signal of the circuit is set to 0 V. When the error is equal to or less than 011111, the output signal is set yo 5 V. When the error is equal to 100,000, the state of output is set at a high impedance. Due to this, the 0 value of the input signal is biased to the center of the range of the A/D converter 600. The set value which is used for the 0-value error detector 400 can be selected to an arbitrary value.

(Embodiment 10)

FIG. 16 constructionally and diagrammatically shows an embodiment of a signal processing apparatus according to the present invention. According to the embodiment, the nonlinear compensation circuit 200-1 including the ROM in the embodiment of FIG. 15 is simplified by substituting therefor a negative pulse compensation circuit 200-2. The remaining of the circuit construction is similar to that of the embodiment of FIG. 15.

In FIG. 16, in the case where flux-to-voltage conversion of the head is as shown in FIG. 21, the negative pulse compensation circuit 200-2 multiplies an applied signal by A/B times only when the signal has a negative value. The nonlinear compensation can be realized by a simple circuit which merely multiplies an applied by A/B times.

(Embodiment 11)

FIG. 17 constructionally and diagrammatically shows an embodiment of a signal processing apparatus according to the present invention. According to the embodiment, the bias setting circuit 100 including an analog circuit such as an operation amplifier or the like in the embodiment of each of FIGS. 14 to 16 is constructed of a digital circuit. The remaining of the circuit construction is similar to that of the embodiment of each of FIGS. 14 to 16.

A 0-value error integrator 400-1 has a function of both of the 0-value error detector 400 and the low pass filter 500 in the embodiment of each of FIGS. 14 to 16, thereby obtaining an average error for the 0 value. After a signal outputted from the A/D converter 600 has been shifted by a bias amount corresponding to the above error by a shift circuit 800 including an adder, a subtractor, and the like, nonlinear compensation of the shifted signal is executed by the nonlinear compensation circuit 200. In the embodiment, all of signal processings after the A/D converter 600 can be realized by a digital circuit.

(Embodiment 12)

Figure 18:
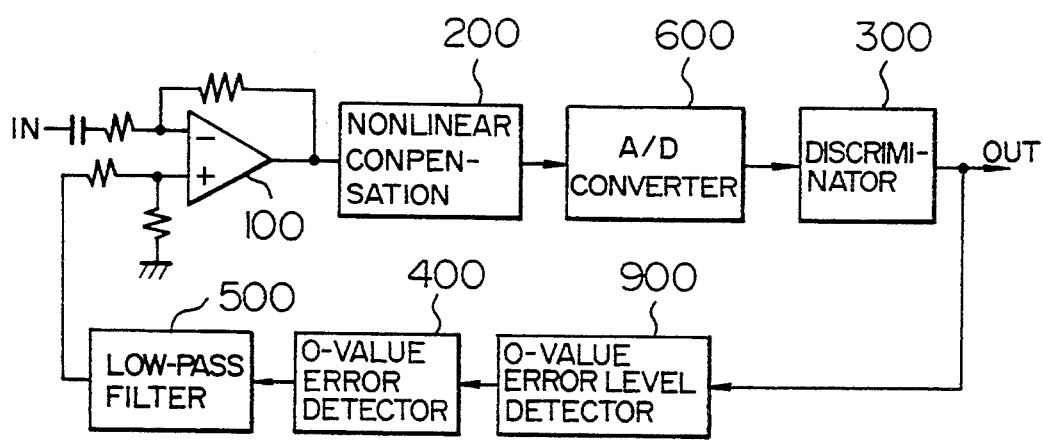
FIG. 18 is a block diagram showing another embodiment of a signal processing apparatus of the invention.

FIG. 18 constructionally and diagrammatically shows an embodiment of a signal processing apparatus according to the present invention. In the embodiment, a 0-value error level detector 900 is provided in the embodiment circuit of FIG. 14. The other construction is similar to that of the embodiment of FIG. 14.

The 0-value error level detector 900 operates so as to ignore the error when an absolute value of the 0-value error is larger than a predetermined value. That is, when the error is large, the value of error is set to, for example, 0 so as not to update the bias amount for the input signal. In the embodiment, using the fact that the error increases when the discriminator 300 erroneously discriminates a data or the like, it is possible to prevent the bias from erroneously being updated. In the embodiment of FIG. 18, an example in which the 0 value error level detector 900 is provided in an input section of the 0-value error detector 400 has been shown. However, it is also possible to arrange both of the 0-value error level detector 900 and the 0-value error detector 400 in parallel and to control so as to set the output of the 0-value error detector 400 to a high impedance when the 0-value error level detector detects a large error.

(Embodiment 13)

Figure 19:
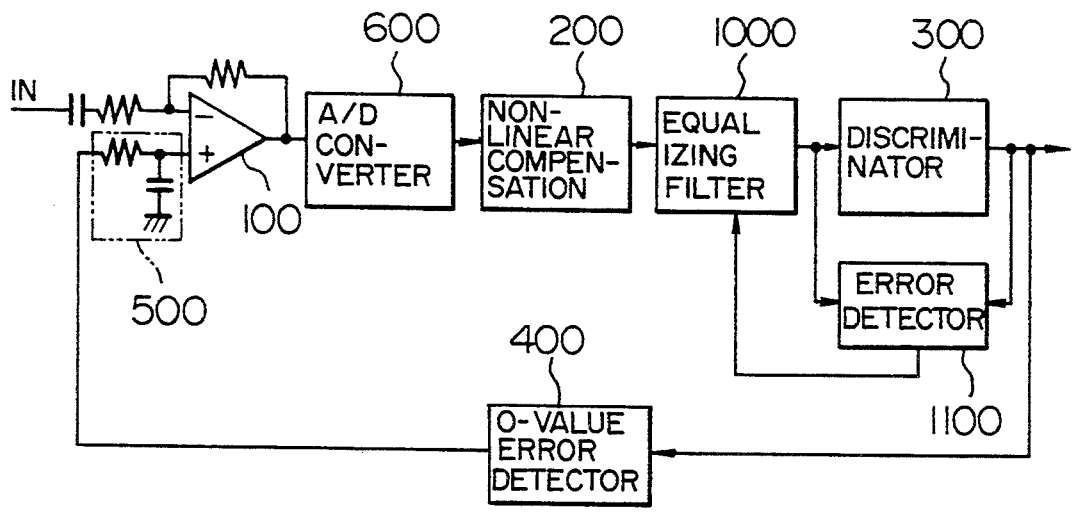
FIG. 19 is a block diagram showing a further embodiment of a signal processing apparatus of the invention.

FIG. 19 constructionally and diagrammatically shows an embodiment of a signal processing apparatus according to the present invention. The embodiment uses the nonlinear compensation circuit 200 and an equalizing filter 1000.

In case of arranging the equalizing filter 1000 subsequent to the nonlinear compensation circuit 200, an error which is obtained from an error detector 1100 can be used as a signal to update a coefficient of the equalizing filter 1000. The error detector 1100 obtains a residual error of the equalizing filter 1000 from the output of the equalizing filter 1000 and the output of the discriminator 300. The input of the equalizing filter 1000 and the output of the discriminator 300 can be also used for error detection.

(Embodiment 14)

Figure 20:
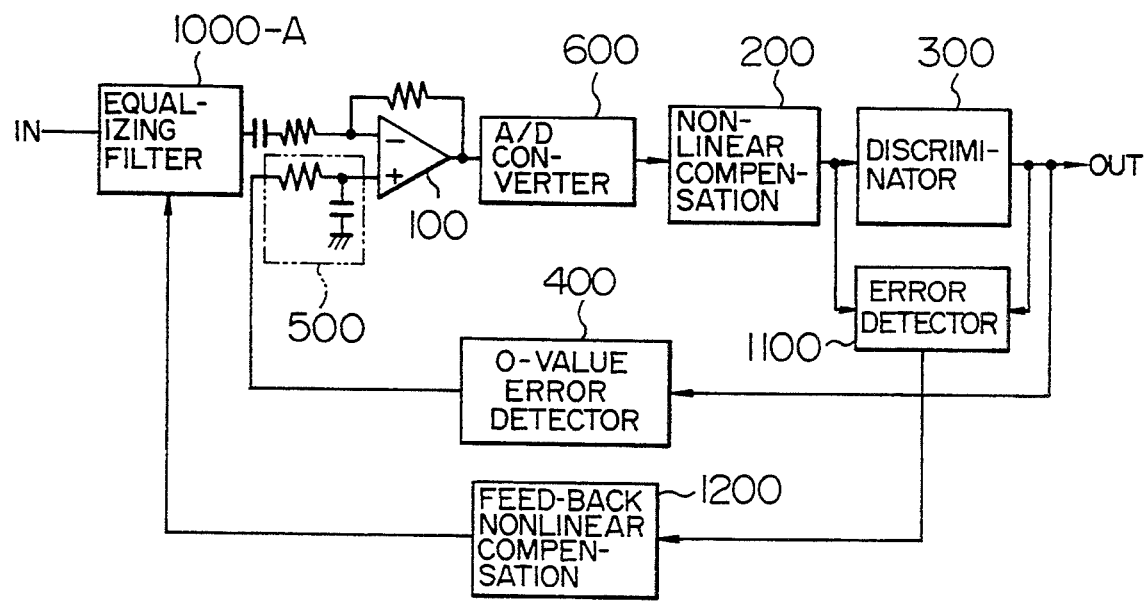
FIG. 20 is a block diagram showing a still further embodiment of a signal processing apparatus of the invention.

FIG. 20 constructionally and diagrammatically shows an embodiment of a signal processing apparatus according to the present invention. In the embodiment, both of the nonlinear compensation circuit and the equalizing filter are used in a manner similar to the embodiment of FIG. 19, and an equalizing filter 1000-A is constructed of an analog filter. In case of arranging the equalizing filter at the preceding stage of the nonlinear compensation circuit, an error which is obtained from the error detector cannot be directly used to update the coefficient of the equalizing filter. In the embodiment, a feed-back nonlinear compensation circuit 1200 is provided so as to perform a feed-back nonlinear compensation to the error. Due to this, the residual error for the asymmetrical input signal can be obtained.

According to the present invention, a signal whose amplitude differs in dependence on the polarity like a data signal read out by an MR head or the like having a nonlinear characteristic can be reproduced at a low error rate. Therefore, even an MR head in which an asymmetry between the upper and lower waveforms of the reproduction waveform is large can be used, a yield of the head can be improved, and the reliability of the magnetic recording apparatus or the like can be remarkably improved.

The present invention is not limited to apparatuses for processing a signal from the MR head, but is generally effective to apparatuses for A/D converting an analog waveform in which asymmetry between upper and lower waveforms of a reproduction waveform is large at a high precision and at a high speed.

Further, by successively compensating the 0 level of the waveform and the scales of upper and lower amplitudes, even in the case where an intensity of magnetic field which is applied to the MR head changes (for example, magnetic field intensities at inner and outer peripheries of the magnetic disk device), the operation can be adaptively performed. Thus, even when the reproduction waveform changes with the elapse of time, the deterioration of the performance can be reduced.

We claim:

1. A signal processing apparatus [according comprising:

an amplifier to amplify an analog signal;
a nonlinear signal processing circuit including compensating means for generating a nonlinear analog output waveform from said amplifier as a linear digital signal at a predetermined sampling time;
a discriminator discriminating digital information using an output of said nonlinear signal processing circuit;
a reproducing head including a magnetoresistive element as a reproducing element;
an automatic gain controller to control a gain of an output signal from said amplifier to thereby amplify an output of said reproducing head; and
a waveform equalizer to process the signal which has passed through the automatic gain controller;
wherein the signal which has passed through said waveform equalizer is supplied to said nonlinear signal processing circuit; and
wherein said nonlinear signal processing circuit includes an A/D converter receiving a nonlinear analog waveform and converting said analog output waveform into a digital signal by scalings which are different in positive and negative polarities.

2. An apparatus according to claim 1, comprising zero level compensating means for compensating a 0 level of the reproduction waveform using an output of said nonlinear signal processing circuit and a discrimination value which is obtained from said output.

3. An apparatus according to claim 1, comprising scale compensating means for controlling scalings which are different in said positive and negative polarities using an output of said nonlinear signal processing circuit and a discrimination value which is obtained from said output.

4. An apparatus according to claim 1, wherein the scalings which are different in the positive and negative polarities of said nonlinear signal processing circuit are set using positive and negative peak values of said nonlinear analog output waveform.

5. A signal processing apparatus comprising:
an amplifier to amplify an analog signal;
a nonlinear signal processing circuit including compensating means for generating a nonlinear analog output waveform from said amplifier as a linear digital signal at a predetermined sampling time; and
a discriminator discriminating digital information using an output of said nonlinear signal processing circuit;
wherein said nonlinear signal processing circuit includes a nonlinear compensation circuit to compensate said nonlinear analog output waveform to a waveform in which waveforms of positive and negative polarities are symmetrical;
wherein said apparatus further comprises a control loop for controlling said nonlinear compensation circuit using a discrimination value which is obtained from the output of said discriminator;
wherein said control loop includes bias setting means for setting a DC bias of said nonlinear compensation circuit; and
wherein said discriminator is formed of a circuit to discriminate a digital data including 0, and said bias setting means comprises:
a 0-value error detector to obtain an error for a discrimination value 0 of said discriminator;
a low pass filter allowing a low frequency component of an output of said 0-value error detector to pass; and
an arithmetic circuit to receive an output of said low pass filter and said input signal.

6. An apparatus according to claim 5, wherein a 0-value error level detector obtaining an error for the input signal on the basis of the input signal and the reproduced data and ignoring said error when the absolute value of the error for predetermined data is larger than a predetermined value is provided between said discriminator and said 0-value error detector.

7. A signal processing apparatus comprising:
an amplifier to amplify an analog signal;
a nonlinear signal processing circuit including compensating means for generating a nonlinear analog output waveform from said amplifier as a linear digital signal at a predetermined sampling time; and
a discriminator discriminating digital information using an output of said nonlinear signal processing circuit;
wherein said nonlinear signal processing circuit comprises:
an A/D converter converting said nonlinear analog output waveform into a digital signal; and
a memory recording data to compensate nonlinearity by using an output of said A/D converter as an address; and
wherein said memory performs compensation in accordance with the positive and negative polarities of said nonlinear analog output waveform.

8. A signal processing apparatus comprising:
an amplifier to amplify an analog signal;
a nonlinear signal processing circuit including compensating means for generating a nonlinear analog output waveform from said amplifier as a linear digital signal at a predetermined sampling time; and
a discriminator discriminating digital information using an output of said nonlinear signal processing circuit;
wherein said nonlinear signal processing circuit includes a nonlinear compensation circuit to compensate said nonlinear analog output waveform to a waveform in which waveforms of positive and negative polarities are symmetrical;
wherein said apparatus further comprises a control loop for controlling said nonlinear compensation circuit using a discrimination value which is obtained from the output of said discriminator;
wherein said control loop includes bias setting means for setting a DC bias of said nonlinear compensation circuit; and
wherein said apparatus further comprises:
an equalizing filter provided at the preceding stage of said discriminator and whose coefficient is variable; and
an error detector making the coefficient of said equalizing filter variable by using the input and output signals of said discriminator.

9. A signal processing apparatus comprising:
an amplifier to amplify an analog signal;
a nonlinear signal processing circuit including compensating means for generating a nonlinear analog output waveform from said amplifier as a linear digital signal at a predetermined sampling time; and
a discriminator discriminating digital information using an output of said nonlinear signal processing circuit;
wherein said nonlinear signal processing circuit includes a nonlinear compensation circuit to compensate said nonlinear analog output waveform to a waveform in which waveforms of positive and negative polarities are symmetrical;
wherein said apparatus further comprises a control loop for controlling said nonlinear compensation circuit using a discrimination value which is obtained from the output of said discriminator;
wherein said control loop includes bias setting means for setting a DC bias of said nonlinear compensation circuit; and
wherein said apparatus further comprises:
an equalizing filter provided on a signal input side of said bias setting means and whose coefficient is variable;
an error detector making the coefficient of said equalizing filter variable by using the signal between the input and output of the discriminator; and
a feed-back nonlinear compensation circuit receiving an output of said error detector, performing a feed-back compensating processing to return said nonlinear process to the original process, thereby forming a signal to set the coefficient of said equalizing filter.

10. A magnetic recording and reproducing apparatus comprising:
a reproducing head using a magnetoresistive element of two terminals as a reproducing element;
an amplifier to amplify a reproduction signal from said reproducing head;
an automatic gain controller to control a gain of said amplified reproduction signal;
a waveform equalizer processing the signal transmitted through said automatic gain controller in an analogwise manner;

an A/D converter to convert the signal transmitted through the waveform equalizer into a digital signal; and a discriminator to generate a reproduction data by using a digital value, wherein said apparatus further includes an A/D converter to convert the waveform of the reproduction signal by scalings which are different in positive and negative polarities and asymmetry between upper and lower waveforms of the reproduction signal is compensated.

11. In a magnetic recording and reproducing apparatus comprising a reproducing head using a magnetoresistive element of two terminals as a reproducing element, a preamplifier, an AGC circuit, an analog waveform equalizer, an A/D converter, a digital waveform equalizer, and a discriminator to identify reproduction data by using a digital value, a reproduction signal processing method comprising the steps of:

using an A/D converting method for converting an output waveform of an analog waveform equalizer into a digital value by scalings which are different in positive and negative polarities, using discrimination data and an output of said digital waveform equalizer which receives an output of the A/D converter, compensating a DC component of an analog reproduction waveform controlling the positive and negative scalings of the A/D converter, and compensating an asymmetry between the upper and lower waveforms of the reproduction waveform.

12. A signal processing apparatus for compensating a nonlinear signal obtained from a magnetic head into a linear signal, comprising:

an amplifier amplifying a nonlinear analog signal obtained by the magnetic head as an input signal;

a nonlinear signal processing circuit compensating the amplified nonlinear signal into a linear digital signal at a predetermined sampling timing, based on a signal compensating a reference of a zero-level of the input signal and a signal compensating an amplitude value of the input signal;

a discriminator discriminating the linear digital signal from the nonlinear signal processing circuit; and a compensating circuit including first compensating means responsive to the nonlinear digital signal and a discriminated output of the discriminator for producing a signal for compensating the zero-level reference, and second compensating means responsive to the nonlinear digital signal and the discriminated output of the discriminator for producing a signal for compensating the amplitude value of the nonlinear analog signal.

13. An apparatus according to claim 12, wherein the nonlinear signal processing circuit includes timing signal means for producing signals indicating timings of positive and negative amplitudes of the output of the discriminator, and the second compensating means is operated at timings of the signals from the timing signal means.

14. An apparatus according to claim 12, wherein the magnetic head is formed of a magnetoresistive element as a reproducing head, the nonlinear signal processing circuit includes an automatic gain controller controlling a gain of the output of the amplifier and a waveform equalizer processing a signal from the automatic gain controller and applying the output of the waveform equalizer to the nonlinear signal processing circuit.

15. An apparatus according to claim 12, further comprising a waveform equalizer supplied with the output of the nonlinear signal processing circuit and the discriminator, the compensating circuit being supplied with the output of the waveform equalizer.

* * * * *